(12) United States Patent
Liang

(10) Patent No.: US 8,057,863 B2
(45) Date of Patent: Nov. 15, 2011

(54) ELECTROSTATIC FORCE ASSISTED DEPOSITION OF GRAPHENE

(75) Inventor: Xiaogan Liang, Berkeley, CA (US)

(73) Assignee: The Regents of the University of California, Oakland, CA (US)

(*) Notice: Subject to any disclaimer, the term of this patent is extended or adjusted under 35 U.S.C. 154(b) by 224 days.

(21) Appl. No.: 12/630,989

(22) Filed: Dec. 4, 2009

(65) Prior Publication Data

US 2010/0140219 A1 Jun. 10, 2010

Related U.S. Application Data

(60) Provisional application No. 61/120,263, filed on Dec. 5, 2008.

(51) Int. Cl.
*B05D 1/28* (2006.01)
(52) U.S. Cl. ......... 427/474; 427/469; 427/472; 427/473
(58) Field of Classification Search ................ 427/469, 427/472–474
See application file for complete search history.

(56) References Cited

U.S. PATENT DOCUMENTS

| 7,449,133 | B2 * | 11/2008 | Gruner et al. | 252/511 |
| 2008/0023067 | A1 * | 1/2008 | Hu et al. | 136/256 |
| 2009/0200707 | A1 * | 8/2009 | Kivioja et al. | 264/293 |

FOREIGN PATENT DOCUMENTS

DE 102007016995 * 10/2008

OTHER PUBLICATIONS

Novoselov et al., "Electric Field Effect in Atomically Thin Carbon Films", Science, 2004, vol. 306, p. 666.
Avouris et al., "Carbon-based electronics", Nature Nanotechnology, 2007, vol. 2, p. 605.
Geim et al., "The rise of graphene", Nature Materials, 2007, vol. 6, p. 183.
Lemme et al., "A Graphene Field-Effect Device", IEEE Electron Device Letters, 2007, vol. 28, p. 282.
Gu et al., "Field effect in epitaxial graphene on a silicon carbide substrate", Applied Physics Letters, 2007, vol. 90, p. 253507.
Liang et al., "Graphene Transistors Fabricated via Transfer-Printing in Device Active-Areas on Large Wafer", Nano Letters, 2007, vol. 7, No. 12, p. 3840.
Li et al., "Chemically Derived, Ultrasmooth Graphene Nanoribbon Semiconductors", Science, vol. 319, Feb. 2008, p. 1229.
Wang et al., "Room-Temperature All-Semiconducting Sub-10-nm Graphene Nanoribbon Field-Effect Transistors", Physical Review Leters, vol. 100, p. 206803 (2008).
Meric et al., "Current Saturation in zero-bandgap, topgated graphene field-effect transistors", Nature Nanotechnology, vol. 3, Nov. 2008, p. 654.

(Continued)

*Primary Examiner* — Frederick Parker
(74) *Attorney, Agent, or Firm* — Lawrence Berkeley National Laboratory; Leonard T. Guzman

(57) ABSTRACT

An embodiment of a method of depositing graphene includes bringing a stamp into contact with a substrate over a contact area. The stamp has at least a few layers of the graphene covering the contact area. An electric field is developed over the contact area. The stamp is removed from the vicinity of the substrate which leaves at least a layer of the graphene substantially covering the contact area.

12 Claims, 6 Drawing Sheets

OTHER PUBLICATIONS

Berger et al., "Ultrathin Epitaxial Graphite: 2D Electron Gas Properties and a Route toward Graphene-based Nanoelectronics", J. Phys. Chem. B, 2004, vol. 108, p. 19912.

Berger et al., "Electronic Confinement and Coherence in Patterned Epitaxial Graphene", Science, vol. 312, May 2006, p. 1191.

Zhou et al., "Substrate-induced bandgap opening in epitaxial graphene", Nature Materials, vol. 6, Oct. 2007, p. 770.

Coraux et al., "Structural Coherency of Graphene on Ir(111)", Nano Letters, 2008, vol. 8, No. 2, p. 565.

Chen et al., "Printed Graphene Circuits", Adv. Mater., 2007, vol. 19, p. 3623.

Eda et al., "Large-area ultrathin films of reduced graphene oxide as a transparent and flexible electronic material", Nature Nanotechnology, vol. 3, May 2008, p. 270.

Stankovich et al., "Synthesis of graphene-based nanosheets via chemical reduction of exfoliated graphite oxide", Carbon, vol. 45, p. 1558 (2007).

Ouyang et al., "Comparison of performance limits for carbon nanoribbon and carbon nanotube transistors", Applied Physics Letters, vol. 89, p. 203107 (2006).

Ouyang et al., "Scaling Behaviors of Graphene Nanoribbon FETs: A Three-Dimensional Quantum Simulation Study", IEEE Transactions On Electron Devices, vol. 54, No. 9, Sep. 2007, p. 2223.

Tapaszto et al., "Tailoring the atomic structure of graphene nanoribbons by scanning tunnelling microscope lithography", Nature Nanotechnology, vol. 3, Jul. 2008, p. 397.

Kuzumaki et al., "Selective processing of individual carbon nanotubes using dual-nanomanipulator installed in transmission electron microscope", Appl. Phys. Lett., vol. 79, No. 27, Dec. 31, 2001, p. 4580.

Palser, "Interlayer interactions in graphite and carbon nanotubes", Phys. Chem. Chem. Phys., 1999, vol. 1, p. 4459.

Rozploch et al., "Graphenes Bonding Forces in Graphite", Acta Physica Polonica A, vol. 112, No. 3, p. 557 (2007).

Nakahara et al., "Structural changes of a pyrolytic graphite surface oxidized by electrochemical and plasma treatment", Journal of Materials Science, vol. 29, p. 3193 (1994).

Lu et al., "Patterning of highly oriented pyrolytic graphite by oxygen plasma etching", vol. 75, No. 2, Jul. 12, 1999, p. 193.

Nemes-Incze et al., "Anomalies in thickness measurements of graphene and few layer graphite crystals by tapping mode atomic force microscopy", Carbon, vol. 46, p. 1435 (2008).

Dayen et al., "Side-Gated Transport in Focused-Ion-Beam-Fabricated Multilayered Graphene Nanoribbons", Small, 2008, vol. 4, No. 6, p. 716.

* cited by examiner

US 8,057,863 B2

ELECTROSTATIC FORCE ASSISTED DEPOSITION OF GRAPHENE

CROSS REFERENCE TO RELATED APPLICATIONS

This application claims priority to U.S. Provisional Patent Application No. 61/120,263 filed Dec. 5, 2008, entitled Electrostatic Force Assisted Deposition of Graphene, Xiaogan Liang inventor, the content of which application is incorporated herein by reference as if fully set forth in its entirety.

STATEMENT OF GOVERNMENT SUPPORT

This invention was made with government support under Contract No. DE-AC02-05CH11231 awarded by the U.S. Department of Energy. The government has certain rights in this invention.

BACKGROUND OF THE INVENTION

The present invention relates to the field of material science and, more particularly, to the field of material science where graphene or few-layer-graphene is deposited onto a substrate.

Recently, graphene and few-layer-graphene (FLG) have been extensively studied as materials for making future electronic devices. Graphene and FLG have exceptional properties, such as high carrier mobility (up to 20,000 $cm^2/Vs$), high saturation velocities, a stable 2D crystal structure, potential to realize ballistic transport at room temperature, and processing compatibility with state-of-the-art silicon technology. Graphene-based electronic devices have been fabricated to study its superior transport properties. Two of the challenges to making commercially viable graphene based electronics are incorporating graphene or FLG material over large areas and fabricating nanoscale features to achieve the desired electronic properties (e.g. to open band-gap in the electronic structure of graphene). Several approaches have been attempted to produce graphene for large area electronics, including epitaxial growth, transfer-printing, solution-based deposition, and chemical vapor deposition. At the same time, efforts have been made to tailor graphene sheets into nanoscale features (e.g. nanoribbons). A method of depositing graphene or FLG having micro- or nano-scale features over large areas would be a benefit to graphene based electronics fabrication.

SUMMARY OF THE INVENTION

The present invention is a method of depositing graphene. According to an embodiment, the method includes bringing a stamp into contact with a substrate over a contact area. The stamp has at least a few layers of the graphene covering the contact area. An electric field is developed over the contact area. The stamp is removed from the vicinity of the substrate which leaves at least a layer of the graphene substantially covering the contact area.

BRIEF DESCRIPTION OF THE DRAWINGS

The present invention is described with respect to particular exemplary embodiments thereof and reference is accordingly made to the drawings in which:

FIG. 1A illustrates an initial setup with an HOPG (highly oriented pyrolytic graphite) template bearing pre-patterned relief features. FIG. 1B illustrates application of a voltage between the HOPG template and a Si substrate after they are brought into contact. FIG. 1C illustrates exfoliation of pre-patterned few-layer-graphenes (FLGs) by electrostatic force as the HOPG template is separated from the substrate. In EFEG, due to the thin screening depth in graphite (<0.5 nm), only several outermost graphene monolayers are held by the electrostatic force, preferably leading to a thin exfoliation thickness of FLGs.

FIG. 2A illustrates a 2D simulation model of EFEG, in which the graphite template bearing a 1 μm diameter, 0.5 μm high pillar is pressed against the Si substrate having a 50 nm thick $SiO_2$, layer and a voltage is applied between the graphite template and the substrate to create an electric field and the electrostatic force. FIG. 2B provides a graph of the electric field versus electrostatic force per unit area. FIG. 2C provides a graph of applied voltage versus the electrostatic force per unit area. The dashed line marks the exfoliation strength for separating a graphene monolayer from a graphite surface (~0.4 MPa).

FIG. 3A shows an array of 1.4 μm diameter pillars. FIG. 3B provides a zoomed view of an individual 1.4 μm diameter, 0.5 μm high pillar. FIG. 3C shows a 15 nm wide, 40 nm high nanoline. The microscale and nanoscale features shown in FIGS. 3A-3C were patterned by photolithography and electron-beam induced deposition (EBID) followed with $O_2$-based reactive ion etching (RIE), respectively.

FIG. 4A shows an array of 1.4 μm diameter FLG pillars. FIG. 4B provides a zoomed view of an exemplary 1.4 μm FLG pillar. FIG. 4C shows an 18 nm wide graphene nanoline. FIG. 4D provides a zoomed view of an individual 18 nm wide graphene nanoline.

FIG. 5A is an image of a 1.4 μm diameter FLG flake exfoliated and printed on the $SiO_2$ surface. The solid line indicates a scanning trace across the flake. FIG. 5B provides a plot of the scanning trace. FIG. 5C provides a stacked column chart of the average thickness data collected from 135 exfoliated/printed 1.4 μm wide FLG flakes on $SiO_2$ surface.

FIG. 6A is an SEM image of an as-exfoliated 32 nm wide FLG nanoline. FIG. 6B is an SEM image of a back-gated graphene field-effect transistor with channel width of 32 nm; channel length of 0.53 μm; gate dielectric ($SiO_2$) thickness of 50 nm, in which platinum finger contacts were deposited as drain and source contacts, and the silicon substrate serves as a back gate. FIG. 6C provides drain-source current $I_{DS}$ as a function of gate voltage $V_G$ under a fixed drain-source voltage $V_{DS}$=20 mV.

DETAILED DESCRIPTION OF THE INVENTION

A novel fabrication method for incorporating nano- to micro-scale few-layer-graphene (FLG) features onto substrates with electrostatic exfoliation is presented here. Highly oriented pyrolytic graphite (HOPG) is patterned using standard lithographic techniques and subsequently, in a single step, exfoliate and transfer-print the pre-patterned FLG features onto a silicon wafer using electrostatic force. The exfoliation/printing of 18 nm wide FLG nanolines and periodic arrays of 1.4 µm diameter pillars have been demonstrated. Furthermore, graphene nanoribbon transistors using the patterned graphene nanoline have been fabricated. The electrostatic force-assisted exfoliation/print process does not use an adhesion layer to transfer graphene or FLG to a substrate and could be stepped and repeated to deliver a pre-patterned graphene of FLG material over wafer-sized areas, and allows the construction of graphene-based integrated circuits.

A micro and nano fabrication process for exfoliating and printing FLG over large areas, termed electrostatic force-assisted exfoliation of pre-patterned graphene (EFEG) is presented here. In this approach, ordered nano and microscale FLG features are exfoliated from a pre-patterned, pristine, HOPG surface and printed on a regular semiconductor substrate (e.g. Si) by applying an electrostatic force. Such electrically exfoliated FLG flakes can be used to make working transistors showing good performance. In the future, this novel technique in combination with other nanolithography approaches may be employed to fabricate graphene-based large-scale integrated circuits (LSI).

Figure 1A:
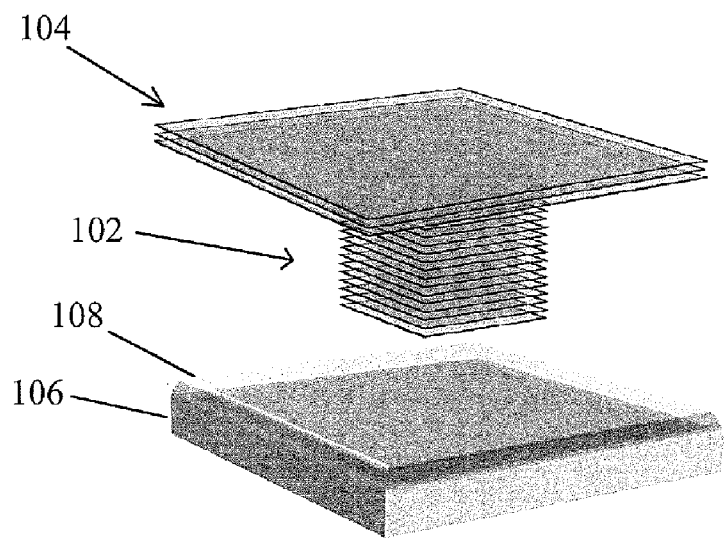
FIGS. 1A-1C provide a schematic flow chart of electrostatic force-assisted exfoliation of pre-patterned few-layer-graphenes (EFEG) (i.e. a method of depositing graphene) of the present invention.
Figure 1B:
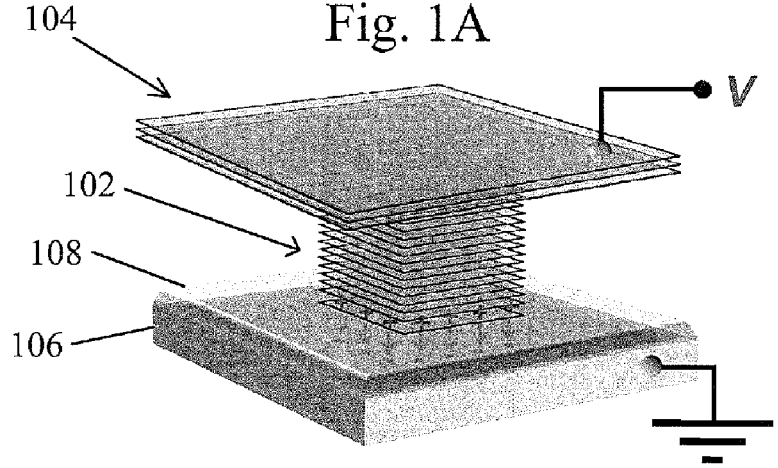
Figure 1C:
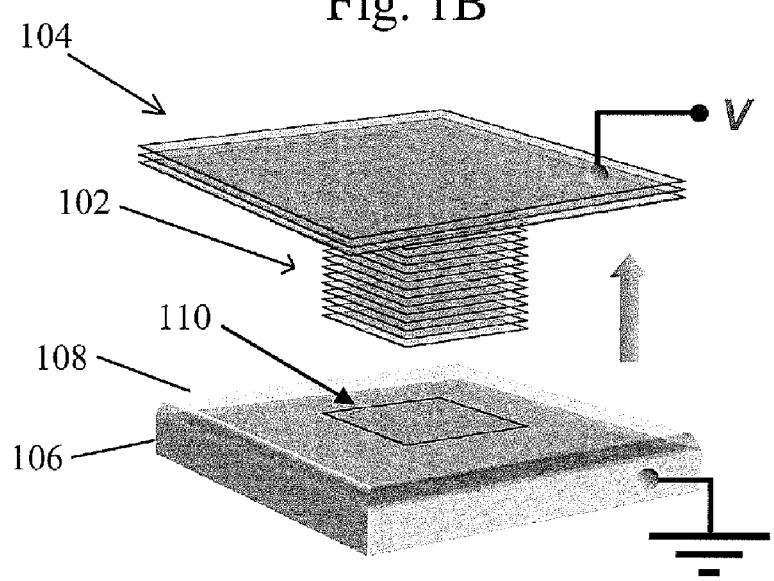

FIGS. 1A-1C provide a schematic flow chart of electrostatic force-assisted exfoliation of graphrenes (EFEG) (i.e. a method of depositing graphene of the present invention). First as illustrated in FIG. 1A, nanometer or micrometer scale relief features 102 (one feature shown in FIGS. 1A-C) are patterned on the surface of a highly oriented pyrolytic graphite (HOPG) disc or block 104 using lithographic techniques followed with reactive ion etching (RIE). This structured HOPG disc serves as a template and is brought into contact with a SiO$_2$/Si substrate. As illustrated in FIG. 1B, a voltage applied between the HOPG disc and a Si substrate 106 produces an electrostatic attraction force acting between the surface of pre-patterned graphitic features and a SiO$_2$ surface layer 108 of the Si substrate 106. As illustrated in FIG. 1C, the HOPG template 104 is vertically moved away from the substrate as the electrostatic force exfoliates the pre-patterned FLG 110 and attaches the FLG onto the SiO$_2$ surface. The thin screening depth in HOPG (less than 0.5 nm) assures that the electrostatic force in the EFEG process acts only on the outmost graphene monolayers during each exfoliation/print cycle, favorably producing thin exfoliated FLG flakes. The pristine FLG features, once exfoliated and printed onto substrate surface, can retain the original pattern arrangement pre-defined on the HOPG template. This exfoliation/print approach does not need an adhesive layer between the SiO$_2$ surface and the HOPG template and could be repeated to print pre-patterned FLG features over a whole wafer area. Furthermore, with using pre-patterned align-marks, EFEG could also be used to place graphene nanostructures into specific locations with a nanometer scale precision.

Various modifications to the method illustrated in FIGS. 1A-1C. For example, the HOPG disc may be replaced with a stamp (e.g. a metal stamp) with a graphene layer or layers attached to one or more protrusions. Such a layer or layers may be attached to the one or more protrusions with an adhesive or by using an electrostatic force to lift the layer or layers from a source of graphene (e.g. an HOPG block).

For the EFEG process, highly oriented pyrolytic graphite (HOPG) discs (SPI, Inc. size=1 cm$^2$) were exfoliated with flexible scotch tape to achieve a flat and pristine graphite surface. In order to fabricate microscale relief features on the graphite disc, a 1.3 µm thick photoresist layer was spun onto the HOPG surface and exposed on an ABM contact printer. After development, the features were etched into the HOPG using O$_2$-based RIE recipe with an etching rate of ~50 nm/min. Finally, the photoresist was removed by soaking the HOPG disc in acetone for 10 min. The nanoscale graphitic features were fabricated using electron beam induced deposition (EBID) followed by RIE. A SiO$_x$ mask was patterned using a Zeiss XB 1540 Focused Ion Beam/SEM Etching/Deposition system equipped with an XENOS pattern generator. The 15-50 nm wide SiO$_x$ nanolines were deposited onto the pristine graphite surface irradiated by a 20 keV electron beam. Afterwards, the nanoscale graphitic features were etched with the same O$_2$ plasma recipe with the SiO$_x$ features acting as the etching mask. Finally, the SiO$_x$ mask was removed in a diluted hydrofluoric acid solution. The EFEG process was used to exfoliate and print the FLG features onto a Si substrate coated with 50 nm thick SiO$_2$, thermally grown in a Tystar oven at 1000° C. For the exfoliation/printing process, the HOPG template and the SiO$_2$/Si substrate were clamped between a pair of home-made parallel plates, and a BK Precision Model 1715 DC power supply (0-50 V) was used to apply voltage between plates. In addition, an atomic scanning microscope (Veeco Caliber SPM-AFM) was employed to measure the thickness of exfoliated FLG features in the tapping mode.

Figure 2A:
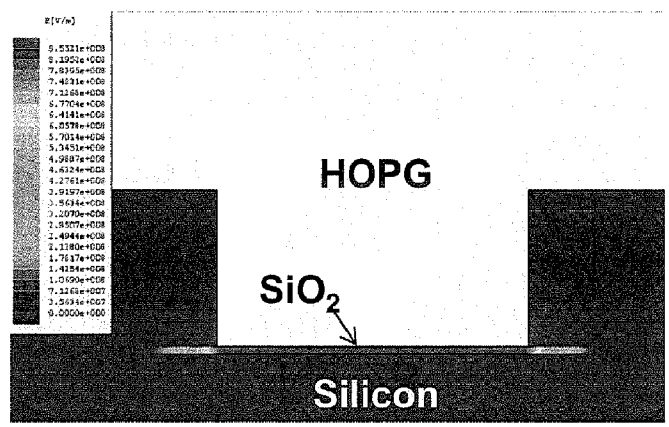
FIG. 2A-2C provides results of a simulation of an electrostatic field developed at a contact between a graphite template and a Si substrate having a $SiO_2$ dielectric layer.
Figure 2B:
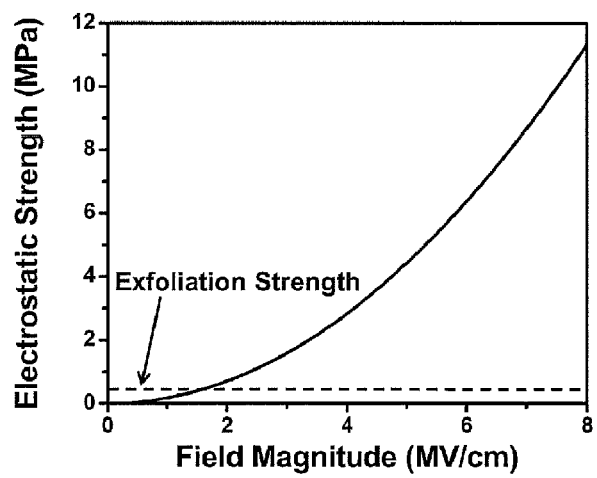
Figure 2C:
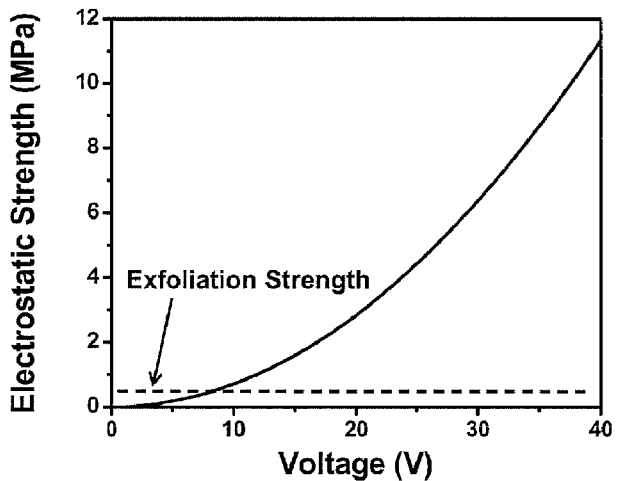

To determine the field strengths needed for performing the EFEG process, the electrostatic exfoliation process was simulated using a commercially distributed software (Ansoft Maxwell SV). FIG. 2A illustrates the 2-dimensional simulation model, in which a HOPG template bearing a 1 µm diameter, 0.5 µm high pillar is pressed against a silicon substrate coated with 50 nm thick SiO$_2$, and a DC voltage is applied between the HOPG template and the silicon substrate. The field distribution and the total electrostatic force were solved using a finite element analysis (FEA). FIG. 2B plots the electrostatic strength [unit: MPa] acting on the graphite surface as a function of the average field magnitude in the SiO$_2$ layer, which is compared with the exfoliation strength of graphene that is defined as the minimum stress required for fully separating a graphene monolayer from the bulk graphite (~0.4 MPa marked by the dashed line). FIG. 2B indicates that the minimum field magnitude required to exfoliate graphene flakes is ~1.7 MV/cm, which is far below the typical breakdown limit of thermally grown SiO$_2$ (~10 MV/cm) and thus should not result in electrical damage. Given a SiO$_2$ thickness of 50 nm, FIG. 2C plots the electrostatic strength versus applied voltage, which indicates that the minimum voltage required for graphene exfoliation is about 8.5 V for this particular setup.

Figure 3A:
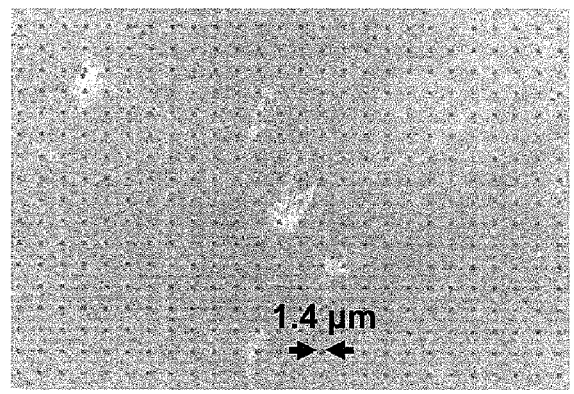
FIGS. 3A-3C are scanning electron microscopy (SEM) images of relief features pre-patterned on a pristine HOPG surface.
Figure 3B:
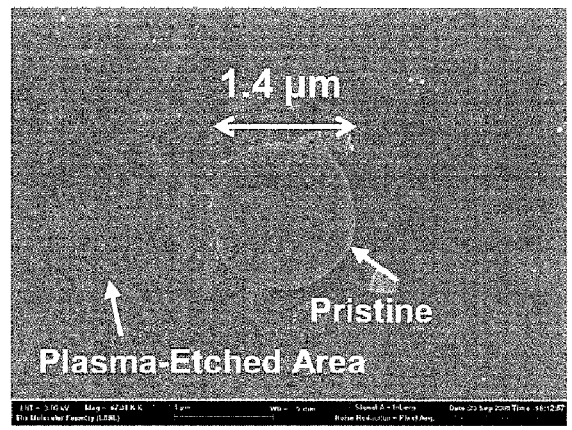
Figure 3C:
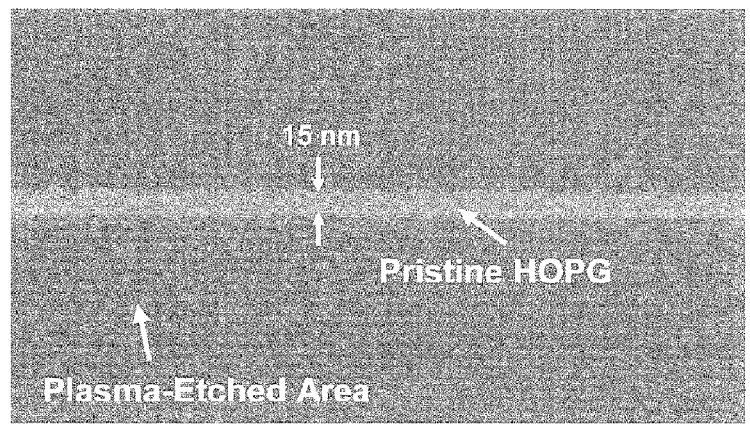

FIGS. 3A-C show scanning electron micrographs (SEMs) of raised microscale and nanoscale features patterned on a HOPG disc by using either photolithography or electron beam induced deposition (EBID) followed with RIE, which include periodic pillars with average diameter of 1.4 µm (FIGS. 3$a$ and 3$b$) and 15 nm wide nanolines (FIG. 3$c$). The heights of microscale and nanoscale features are about 0.5 µm and 40 nm, respectively. The high magnification SEMs in FIGS. 3B and 3C show that the O$_2$ plasma-etched area has a higher roughness than a pristinie HOPG surface, and this is attributed to the oxidation of graphite surface. However, the feature area protected by the etching masks (photoresist or SiO$_x$) is still as smooth as a pristine graphite surface. This should yield a conformal contact with the flat substrate during an EFEG process and therefore a high transfer-printing efficiency of graphene.

Figure 4A:
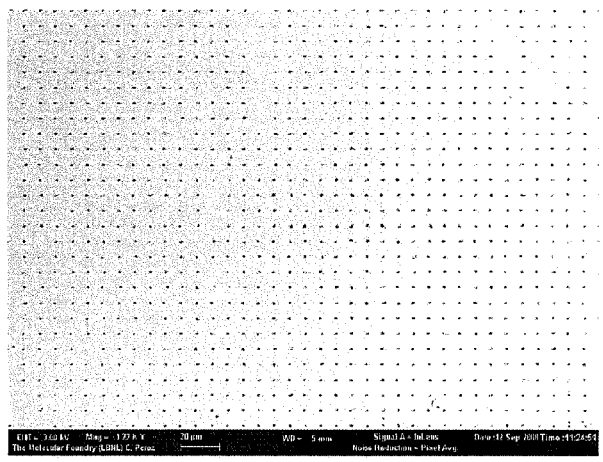
FIGS. 4A-4D are SEM images of exfoliated and printed pre-patterned FLG features on a $SiO_2$/Si substrate produced according to a method of the present invention.
Figure 4B:
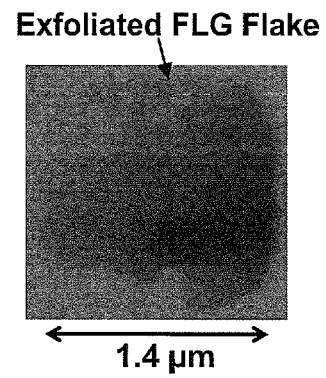
Figure 4C:
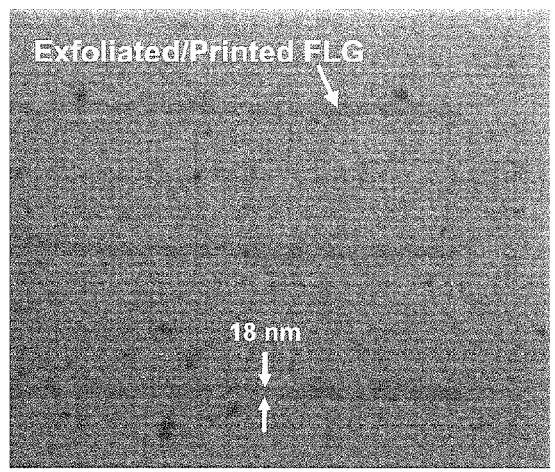
Figure 4D:
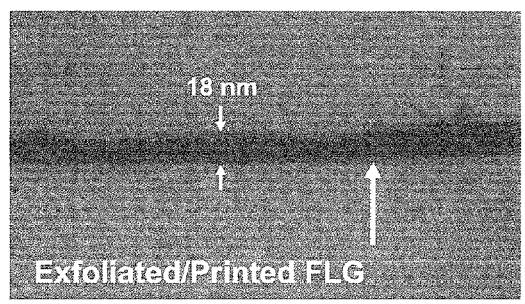

FIGS. 4A-D show SEMs of microscale and nanoscale FLG features electrically exfoliated and printed on a SiO$_2$ surface by EFEG. FIG. 4A shows a low magnification SEM of the array of 1.4 µm diameter FLG pillars. It is believed that the grayscale variation of the graphitic flakes over the large area is due to the variation of FLG thickness over the wafer or ripples in the surface of graphene. These variations were analyzed using atomic force microscopy (AFM), which is discussed more fully below. FIG. 4A demonstrates that the EFEG process can exfoliate and print graphitic material over large areas without using any adhesion coating layer, and the exfoliated flake can retain the arrangement and periodicity of the original pattern on the HOPG template. The high-magnification SEM in FIG. 4B shows the zoomed view of an exemplary FLG pillar, which displays that the most area of the flake was conformably adhered to the flat SiO$_2$ surface by the electrostatic force in spite of a partially wrapped edge. It is believed that this arises due to the interlayer drag force in the graphite during the graphene exfoliation. FIG. 4C shows the SEM of 18 nm wide, 1.5 µm long graphene nanolines with a spacing of 300 nm printed on the same SiO$_2$ surface, and FIG. 4D shows the zoomed view of an individual 18 nm wide graphene nanoline, which demonstrates that the EFEG process is also capable of directly incorporating nanoscale pre-engineered graphene features (e.g. nanoribbons) into device sites (e.g. transistors). So far the maximum SiO$_2$ area incorporated with graphene is limited by the HOPG disc area, but the EFEG process could be performed in a step-and-repeat fashion to extend the total processing area. In addition, as a control experiment, transfer-printing of pre-patterned FLGs was performed on the same SiO$_2$ surface without applying the electric field, and it was found that the area incorporated with FLG flakes is about two orders of magnitude smaller than that generated by EFEG. In particular, the area incorporated with FLG flakes when not using EFEG was less than 10% of that provided by EFEG. Therefore, it is concluded that the electrostatic force indeed plays a significant role in the exfoliation of graphene features from the HOPG template.

Figure 5A:
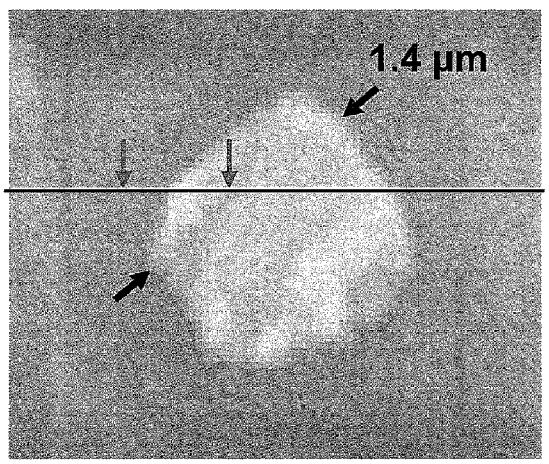
FIGS. 5A-5C provide results of atomic force microscopy (AFM) measurements of an FLG flake on a $SiO_2$/Si substrate produced according to a method of the present invention.
Figure 5B:
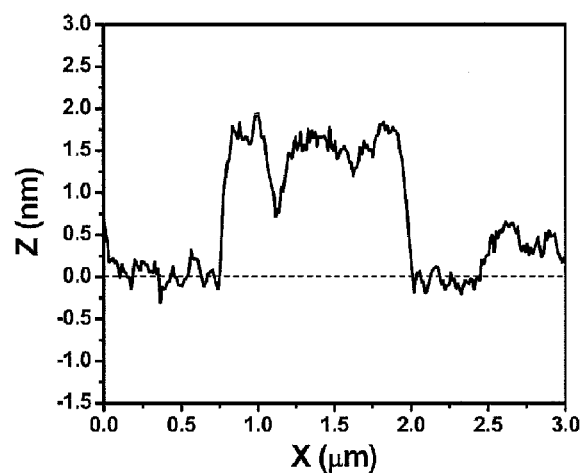
Figure 5C:
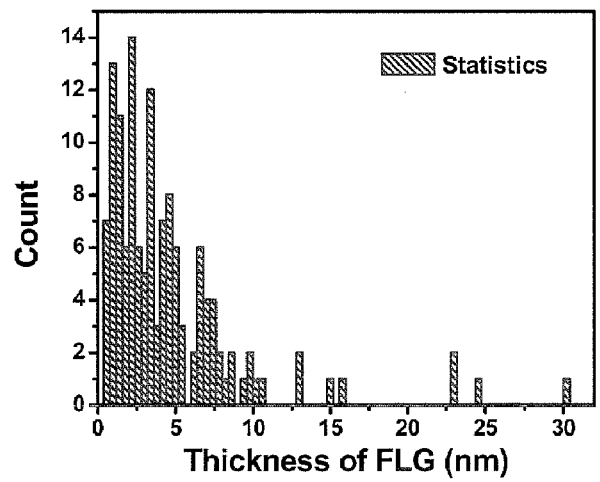

AFM images were obtained to measure the thickness of exfoliated FLG features, and the thickness value was interpreted to determine a number of graphene monolayers. FIG. 5A shows the AFM image of an individual 1.4 µm wide FLG flake printed on SiO$_2$ surface. The AFM image clearly displays a variation of FLG thickness over the whole flake. It is believed that there are three possible causes for this variation: (1) the folding or wrapping of graphene edge, (2) the variation of the number of graphene monolayers over the whole FLG flake, and (3) the rippling of the graphene surface generated during the printing/exfoliation course. The scanline denoted by the solid line and accordingly plotted in FIG. 5B explicitly exhibits a variation of FLG thickness from $t_{min}$=0.72 nm (1 monolayer) to $t_{max}$=1.94 nm (5 monolayers) with an average value of $t_{avg}$=1.54 nm (4 monolayers) (standard deviation σ=0.25 µm). Furthermore, the average thickness data of 135 1.4 µm wide FLG flakes exfoliated in a single EFEG cycle is presented as a stacked column chart (FIG. 5C). FIG. 5C shows an inter-flake variation of the average FLG thickness over the whole printed area (~1 cm$^2$), which ranges from 0.5 nm (1 monolayer) to 30 nm (87 layers) with a most-likely value of ~2.7 nm (7 layers); average thickness of 4.5 nm (12 layers) (standard deviation of 3.0 nm).

In order to evaluate the electronic characteristic of FLGs exfoliated and printed with the EFEG process, graphene nanoribbon field effect transistors (GFETs) were fabricated using exfoliated FLG nanolines on SiO$_2$/Si substrates. A cross-beam system equipped with a pattern generator was used to deposit platinum finger contacts to define drain/source contacts on FLG nanolines, which also connect the graphene channel with the large metal contact pads (4 nm Cr/75 nm Au), which were fabricated by photolithography followed with lift-off in acetone after the EFEG process. Finally, another metallic contact was made onto the Si substrate, which serves as a back gate contact.

Figure 6A:
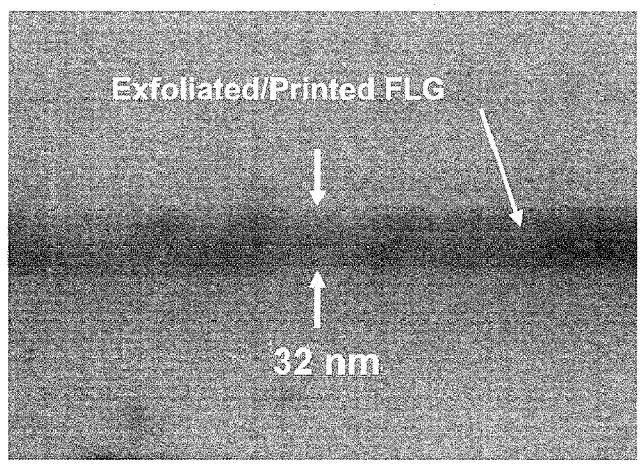
FIGS. 6A-6C provide SEM images and test results related to graphene field-effect-transistors produced with an FLG nanoline deposited according to a method of the present invention.
Figure 6B:
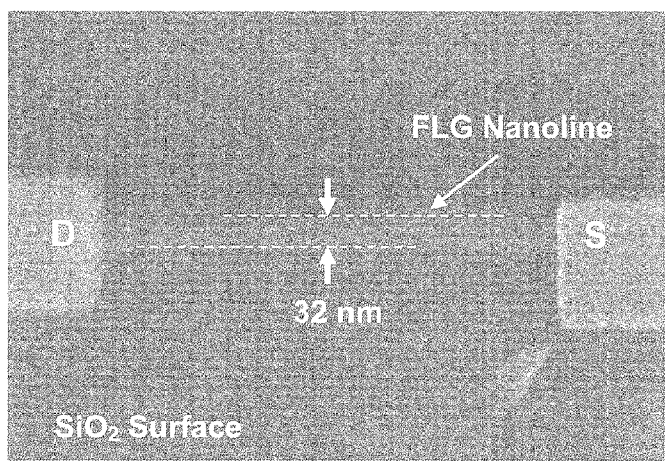
Figure 6C:
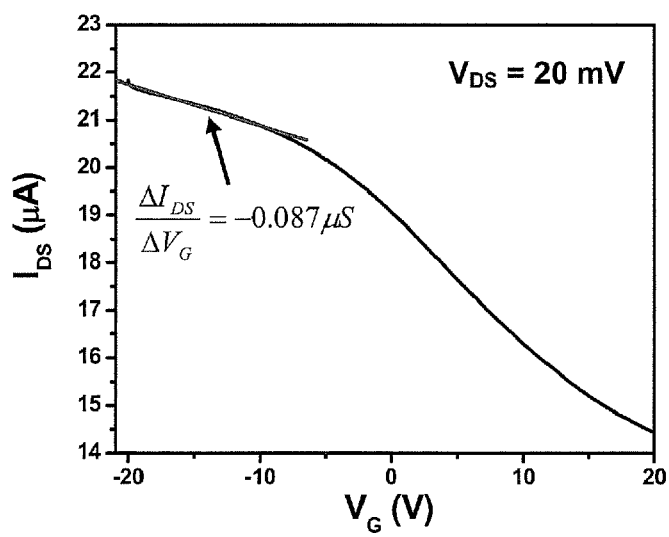

FIG. 6A shows the SEM of an as-exfoliated 32 nm wide FLG nanoline, which was used to fabricate a back-gated graphene nanoribbon FET with channel length of L=0.53 µm and gate dielectric thickness of d=50 nm, as shown in FIG. 6B. The device characteristic curves of this GFET device were measured using an Agilent-4155 semiconductor parameter analyzer. FIG. 6C plots the drain-source current ($I_{DS}$) as a function of the gate voltage ($V_G$) under a fixed drain-source voltage ($V_{DS}$=20 mV). As shown in FIG. 6C, this back-gated graphene nanoribbon FET exhibits a typical gate modulation behavior for the hole-dominated conduction in the range of $V_G$ from $V_G$=–20 V to 20 V (field magnitude ξ=–4 MV/cm to 4 MV/cm), and the curve slope value (or transconductance) at the linear region was obtained to be $\Delta I_{DS}/\Delta V_G$=–0.087 µS by the linear fitting (denoted with the red solid line). The hole mobility was subsequently extracted to be $\mu_h$=1,050 cm$^2$/Vs by using eq. 1, $$\mu = \frac{\Delta I_{DS}}{C_{ox}\frac{W}{L}V_{DS}\Delta V_G} \quad C_{ox} = \frac{\varepsilon_0 \varepsilon_r}{d} \quad \text{(Eq. 1)}$$

where $\epsilon_0$ is the vacuum permittivity; $\epsilon_r$~3.9 is the dielectric constant of SiO$_2$; $C_{ox}$ is the gate capacitance; w/L is the width/length ratio of the graphene channel. This hole mobility value is among the highest mobility values reported for few-layer-graphenes contacting a supporting material surface, and indicates that the EFEG approach can be used to build nanoscale graphene devices with excellent performance. Electron conduction in the range of $V_G$ from –20 V to 20 V was not observed. The loss of electron conduction may be attributed to the unexpected contamination of HOPG during the material handling, which may shift the bipolar transition point out of the measurement range.

In summary, a novel approach for printing pre-patterned few-layer-graphenes into the device locations has been developed and demonstrated, named as electrostatic force-assisted exfoliation of few-layer-graphenes (EFEG). In this process, the microscale and nanoscale features are pre-patterned onto a HOPG disc, which serves as both a template and source of material. When the HOPG template is brought into a conformal contact with a Si substrate coated with SiO$_2$, a voltage is applied between HOPG and Si and generates an electrostatic force, which can exfoliate the pre-patterned FLG features as the HOPG template is removed. With this approach, the exfoliation/printing of FLG features with critical dimensions ranging from 18 nm to 1.4 µm was demonstrated. In addition, the electrically printed FLG flakes have been used to build graphene nanoribbon transistors with excellent performance. This novel printing approach does not need an adhesion layer between the FLG flake and the SiO$_2$ surface and can be repeatedly performed to incorporate graphitic materials over a large area in a parallel fashion.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of depositing graphene comprising:
bringing a stamp into contact with a substrate over a contact area, the stamp having one or more layers of the graphene covering the contact area;
developing an electric field over the contact area; and
removing the stamp from the vicinity of the substrate which leaves at least a layer of the graphene substantially covering the contact area.

2. The method of claim 1 wherein the stamp comprises highly ordered pyrolytic graphite.

3. The method of claim 2 further comprising:
developing a resist over the contact area of the highly ordered pyrolytic graphite;
etching a surface of the highly ordered pyrolytic graphite in areas not covered by the resist; and
removing a remainder of the resist to produce the contact area having a pre-patterned surface.

4. The method of claim 3 wherein removing the stamp from the vicinity of the substrate leaves at least a layer of the graphene having a pattern produced by the pre-patterned surface.

5. The method of claim 1 wherein the substrate includes a dielectric surface layer.

6. The method of claim 5 wherein developing the electric field over the contact area comprises applying a voltage from below the dielectric layer of the substrate to above the one or more layers of the graphene of the stamp.

7. The method of claim 6 wherein the dielectric layer comprises $SiO_2$.

8. The method of claim 7 the substrate below the dielectric layer comprises Si.

9. A method of depositing graphene comprising:
bringing a stamp into contact with a dielectric surface of a substrate over a contact area, the stamp having one or more layers of the graphene covering the contact area;
applying a voltage from the substrate below the dielectric layer to the stamp above the contact area; and
removing the stamp from the vicinity of the substrate which leaves at least a layer of the graphene substantially covering the contact area.

10. The method of claim 9 wherein the substrate comprises a Si substrate and the dielectric layer comprises $SiO_2$.

11. The method of claim 10 wherein the voltage is selected such that an average electric field magnitude at the dielectric layer is less than about 10 MV/cm.

12. The method of claim 10 wherein the voltage is selected such that an average electric field magnitude at the dielectric layer is at least about 1.7 MV/cm.

* * * * *